United States Patent
Umeda et al.

(10) Patent No.: US 7,375,500 B2
(45) Date of Patent: May 20, 2008

(54) METHOD OF CALCULATING POWER GENERATING TORQUE OF SYNCHRONOUS GENERATOR

(75) Inventors: Atsushi Umeda, Okazaki (JP);
Tsutomu Shiga, Nukata-gun (JP);
Kouichi Ihata, Okazaki (JP)

(73) Assignee: Denso Corporation, Kariya (JP)

( * ) Notice: Subject to any disclaimer, the term of this patent is extended or adjusted under 35 U.S.C. 154(b) by 69 days.

(21) Appl. No.: 11/494,673

(22) Filed: Jul. 28, 2006

(65) Prior Publication Data
US 2007/0024248 A1    Feb. 1, 2007

(30) Foreign Application Priority Data
Jul. 29, 2005    (JP)    ............................. 2005-220488

(51) Int. Cl.
*H02P 9/04*    (2006.01)

(52) U.S. Cl. ..................... 322/29; 322/36; 290/40 A (58) Field of Classification Search ................ 322/22, 322/29, 36, 38, 99; 290/40 R, 40 A
See application file for complete search history.

(56) References Cited

U.S. PATENT DOCUMENTS

| 5,988,137 A * | 11/1999 | Tamura et al. ............... 123/295 |
| 6,894,402 B2 * | 5/2005 | Dubus et al. ............. 290/40 C |
| 7,009,365 B1 * | 3/2006 | Namuduri et al. ........... 322/23 |

FOREIGN PATENT DOCUMENTS

JP    A 2003-74388    3/2003

* cited by examiner

*Primary Examiner*—Nicholas Ponomarenko
(74) *Attorney, Agent, or Firm*—Oliff & Berridge, PLC (57) ABSTRACT

A method of calculating torque of a Lundell-type synchronous generator is disclosed in which only power generation output current and a rotational speed are input for calculation of the amount of electric power and the amount of losses for thereby enabling calculation of power generating torque, based on a sum of the amount of electric power and the amount of losses, which is generated as an output. The present method establishes formulae enabling calculation based on only output current and the rotational speed, enabling a minimal number of inputs to shorten a calculation time interval.

20 Claims, 4 Drawing Sheets

METHOD OF CALCULATING POWER GENERATING TORQUE OF SYNCHRONOUS GENERATOR

CROSS REFERENCE TO RELATED APPLICATION

This application is related to Japanese Patent Application No. 2005-220488 filed on Jul. 29, 2005, the content of which is hereby incorporated by reference.

BACKGROUND OF THE INVENTION

1. Technical Field of the Invention

The present invention relates to a method of calculating power generating torque of a synchronous generator, especially, a vehicular Lundell-type synchrounous generator.

2. Description of the Related Art

In recent years, attempts have heretofore been made to reduce the amount of fuel, such as gasoline, to be injected into an engine with a view to achieving the improvement in fuel consumption. To this end, the engine is controlled in a pinpoint precision to rotate in stability. In the meanwhile, an electric energy needed for the engine for safety and comfort purposes is rising year to year and a generator (alternator), connected to the engine, has been increasing in size. This results in an issue with the occurrence of an increase in torque of the generator accompanied by instable rotation of the engine. For instance, under circumstances where large electric load is turned on to rapidly increase the electric energy of the generator, a drop occurs in a rotational speed of the engine with a consequence of engine stop.

To address such an issue, research and development work has heretofore been taken to provide technique of conducting integrated management of electrical loads through the use of a communication system inside the vehicle for predicting power generating torque to control the amount of fuel to be injected to the engine with a view to achieving stability in engine rotation.

However, even if the related art practice has enabled the prediction of the amount of generated electric power (electric current in generated electric power), a difficulty has been encountered in accurately calculating power generating torque on this occasion. Power generation torque represents a turning force equivalent to energy to be consumed. In this case, energy to be consumed is a sum of generated electric power and the amount of loss dissipated in heat. For example, even with output currents at the same value, variation takes place in a coil resistance value depending on surrounding temperatures with the resultant change in heating value. Thus, a need arises for accurately obtaining the amount of losses of the generator depending on an operating status of the generator and usage environment thereof, otherwise no success can be expected in calculating power generating torque.

Further, the amount of losses of the generator is broken down into copper loss, rectification loss, excitation loss, iron loss and mechanical loss. Among these, iron loss particularly consumed in an iron core results from hysteresis loss and eddy-current loss in mixture and, hence, a calculation formula becomes complex with the resultant difficulty in identifying the cause of losses. This results in deterioration in precision of calculation results. Moreover, a remarkable increase occurs in a time interval needed for calculation and it has been conceived that no computation of such factors is possible with a computer Installed on the vehicle.

Therefore, attempts have taken to preliminarily assume the environment for the generator to be used and prepare a map covering a whole range of conceivable combinations of factors while actually measuring parameters such as temperatures or the like and retrieving target torque from the map. However, this results in a need for preparing torque data in a multidimensional approach in conformity to various statuses and, thus, considerable efforts are needed for measurements. This causes a remarkable increase in a volume of data with the resultant increase in a retrieving time interval and another issue arises in a difficulty of processing these data in an ECU. Moreover, a large number of sensors are needed for measuring input values of the parameters and cause an increase in production cost. Also, if the volume of data and the amount of inputs are restricted, then, another issue arises with a difficulty in obtaining high precision.

SUMMARY OF THE INVENTION

The present invention has been completed with a view to addressing the above issues and has an object to provide a method of calculating power generating torque of a vehicular generator wherein various factors of losses are simplified to introduce equations for calculation to be executed in less labor hour for preparation of a map in a multidimensional approach to allow the use of a minimal amount of input values in a structure with low cost while enabling calculation on a level of an ECU with a small scale and obtaining precision needed for engine control.

To address the above issues, a Lundell-type synchronous generator of a first aspect of the present invention takes only two factors including output current in generated electric power and a rotational speed based on which an electric energy and the amount of losses are calculated to provide a total sum of the electric energy and the amount of losses for calculating power generating torque to output a calculation result.

With the method of calculating power generating torque, equations are established to complete calculation with inputs of only output current and a rotational speed, enabling a minimal number of inputs to be applied for achieving calculation within a shortened time period. Accordingly, in contrast to the related art practice encountered with the need for large number of inputs and complicated calculations under no circumstances for engine control, the present invention enables the torque calculation method to be adopted for engine control. Also, the present method needs only a minimal number of sensors for obtaining requisite inputs with an advantageous effect of reduction in cost.

With a second aspect of the method of calculating power generating torque, a rectifying-element drop voltage Vdi, a battery charging voltage $V_{DC}$ and DC/AC conversion rate k are preliminarily fixed as specified values.

With the respective variables being defined as the specified values as mentioned above, no need arises for introducing new variables and accurate calculation of losses can be achieved. Further, since these variables have no need to be changed even in the presence of a change in products, no processing effort is required for correction of programs on a calculation device and the processing effort can be simplified.

With a third aspect of the method of calculating power generating torque, product Information includes preliminarily specified variables such as stator resistance R, maximal excitation current $If_{full}$, a maximal output current value $I_{full}$ and an average surrounding temperature T in terms of the rotational speed when installed on an engine, and the number P of poles. Since these variables are preliminarily specified in compliance with products, no need arises for introducing new variables and accurate calculation of torque can be achieved within a shortened time period.

With a fourth aspect of the method of calculating power generating torque, the amount of losses is calculated as a total sum of copper loss, rectification loss, excitation loss, iron loss and mechanical loss such that computation is executed for copper loss and excitation loss using a square value of output current and computation is executed for rectification loss and iron loss using a single-multiplication value. Given the above, various losses can be calculated as a simplified function of output current and the calculation can be simplified enabling engine control to be executed through the use of an ECU with a small-scale. Further, losses of various parts are individually calculated with the resultant improvement in precision in calculating torque. Moreover, even if product specifications are changed, altered calculations can be easily achieved.

With a fifth aspect of the method of calculating power generating torque, the amount of losses is calculated as a total sum of copper loss, rectification loss, excitation loss, iron loss and mechanical loss wherein iron loss is calculated as a sum of a single-multiplication proportion and a square proportion of the rotational speed N. The use of a value of the rotational speed and utilizing a simplified calculation formula results in capability of simplifying the calculation, making it possible to perform engine control with the use of an installed ECU with a small-scale.

With a sixth aspect of the method of calculating power generating torque, the amount of losses is calculated as a total sum of copper loss, rectification loss, excitation loss, iron loss and mechanical loss wherein iron loss is calculated in a single-multiplication proportion of the rotational speed N. The use of a value of the rotational speed and utilizing a simplified calculation formula results in capability of simplifying the calculation, making it possible to perform engine control with the use of an installed ECU with a small-scale.

With a seventh aspect of the present method, copper loss is calculated upon speculating a temperature of a stator based on information related to output current and the rotational speed and altering a resistance value based on the stator temperature. The use of only information related to output current and the rotational speed allows the stator temperature to be speculated and no temperature sensor is needed, resulting in reduction in cost. Also, since no need arises for executing the processing for data to be input or output making it possible to perform engine control with the installation of an ECU with a small-scale. Moreover, since copper loss is calculated upon consideration of the temperature, the amount of losses can be accurately calculated while enabling the calculation of a torque value.

With an eighth aspect of the present method, rectification loss is a value resulting from output current two times an element drop. The use of only an output current value enables the calculation, resulting in simplified calculation.

With a ninth aspect of the present method, excitation loss is proportionate to a square of output current and calculated based on information related to maximal excitation current $I_{full}$. The calculation of copper loss is executed based only on a square value of output current being input and information of maximal excitation current that has been preliminarily set, enabling the simplification of calculation.

With a tenth aspect of the present method, the amount of losses is calculated as a total sum of copper loss, rectification loss, excitation loss, iron loss and mechanical loss wherein mechanical loss is calculated as a sum of a single-multiplication proportion and a square proportion of the rotational speed N. The use of a value of the rotational speed and utilizing a simplified calculation formula results in capability of simplifying the calculation, making it possible to perform engine control with the use of an installed ECU with a small-scale.

With an eleventh aspect of the method of calculating power generating torque, the amount of losses is calculated as a total sum of copper loss, rectification loss, excitation loss, iron loss and mechanical loss wherein mechanical loss is calculated in a single-multiplication proportion of the rotational speed N. The use of a value of the rotational speed and utilizing a simplified calculation formula results in capability of simplifying the calculation, making it possible to perform engine control with the use of an Installed ECU with a small-scale.

The method of calculating electric power generating torque was established only by inputting the rotational speed N of the generator and current $I_B$ in generated power in a manner expressed below.

First, excitation current of a rotor is computed. Excitation current of the rotor varies in substantially proportion to output current $I_B$.

During operation of the generator with the maximum current $I_{full}$ for each rotation, since excitation current takes the maximum excitation current $If_{full}$ current can be computed based on the proportionate relationship in an equation expressed as $$If = If_{full} \cdot \left(\frac{I_B}{I_{full}}\right). \tag{1}$$

Next, gross current $I_{gross}$ is computed in an equation expressed as.

$$I_{gross} = kI_B + If = \left(1 + \frac{If_{full}}{I_{full}}\right)I_B. \tag{2}$$

Subsequently, DC/AC conversion is executed.

In general, a rate k for conversion from $I_{DC}$ to an alternating current root-mean-square value $I_{AC}$ is expressed by a relational expression as $$I_{DC} = kI_{AC} \tag{3}.$$

The conversion rate k is probable to be slightly deviated due to distortion of a waveform and expressed in a theoretical figure of k=1.35.

Current $I_{st}$ flowing through the stator corresponds to a gross alternating current value and is expressed as $$I_{st} = \frac{1}{k}\left(1 + \frac{If_{full}}{I_{full}}\right)I_B. \tag{4}$$

Hereunder, respective losses are calculated in sequence. Since a total sum of losses is finally obtained, no order of calculating losses has an adverse affect.

(a) Copper Loss:

When using the alternating current root-mean-square value of the stator, copper loss becomes a total sum of heat generated for respective phases and expressed as $$W_{st} = mI_{st}^2 R \tag{5}$$

($W_{AC}$: copper loss of a stator R: resistance per phase m: number of phases). Resistance of the stator varies depending on temperatures and, so, a need arises for predicting the temperature depending on the magnitude of output current. Calculation is executed this time for each rotational speed based on a predicted value expressed as $$T = 140\left(\frac{I_R}{I_{full}}\right)^2 + T_o \qquad (6)$$

($W_{full}$: full output for each rotation $I_B$: output current to be calculated).

Upon estimating such a temperature, a resistance value can be estimated as $$R = \frac{\rho + T}{\rho + T_o} R_o \qquad (7)$$

($T_o$: initial temperature, $R_o$: initial resistance, $\rho$: coefficient), where $\rho$ represents an individual value depending on a temperature of each metal and is expressed as the coefficient of copper in the present embodiment as $\rho=234.5$.

Substituting Equation (6) to Equation (7) to newly organize the coefficient gives $$R = (k_1 + k_2 I_B^2) R_O \qquad (8).$$

Substituting this Equation (8) to Equation (5) to reorganize Equations (1) to (7) gives $$W_{st} = m\left\{\frac{1}{k}\left(1 + \frac{If_{full}}{I_{full}}\right)\right\}^2 I_B^2 (k_1 + k_2 I_B^2) R_0. \qquad (9)$$

Further, reorganizing this Equation with the coefficient gives $$W_{st} = \alpha I_B^2 (k_1 + k I_B^2) \qquad (10).$$

Thus, calculation can be executed in computation using a square value of $I_B$.

(b) Rectification Loss:

Output current to be converted to DC current flows two times through an earth-site and a B-site to take an average value of $I_B$ and can be computed in a manner expressed as $$W_{rec} = 2Vdi(I_B + If) = 2Vdi\left(1 + \frac{If_{full}}{I_{full}}\right) I_B. \qquad (11)$$

(c) Excitation Loss:

Excitation current is requisite and a product of excitation current and voltage results in excitation loss. As excitation current is small, excitation voltage is also small and, after all, excitation loss is assumed by an Equation expressed as $$W_{rot} = V_f If - V_{DC}\left(\frac{I_B}{I_{full}}\right) \cdot If_{full}\left(\frac{I_B}{I_{full}}\right) = V_{DC} If_{full}\left(\frac{I_B}{I_{full}}\right)^2. \qquad (12)$$

(d) Mechanical Loss:

Mechanical loss can be approximated only through power generation frequency N and, hence, is obtained in polynomial Equation expressed below. Here, a 2nd-term can be expressed as $=0$ in conformity to the degree of a need in precision of a torque calculation value.

$$W_{mech} = \{\gamma \cdot f + \epsilon \cdot f^2\} \qquad (13),$$

where $\gamma$ and $\epsilon$ represent coefficients and f represents a rotational speed.

(e) Iron Loss:

From experiment data in the past, it has been predicted that with the Lundell-type synchronous generator, iron loss is proportionate to an output current value. This is predicted because a synthesized magnetic flux is distorted due to reacting magnetic flux resulting from output current and an iron core of a Lundell-type rotor is made of core formed in a non-laminated structure in general practice to be apt to cause the occurrence of eddy current.

A basic principle of iron loss (loss in an iron core) occurring at a maximal current $I_{full}$ for each rotation of the rotor is supposed to have a correlation with hysteresis loss and eddy current loss and predicted to take functions of a first power and a square of a frequency. Given the above, Equation (14) is selected.

Using a regression curve resulting from the experimental results determined $\alpha$ and $\beta$.

$$W_{core} = \{\alpha \cdot f + \beta \cdot f^2\} \frac{I_B}{I_{full}} \qquad (14)$$

($\alpha$, $\beta$: coefficients, f: a frequency in power generation, $I_B$: output current).

With the present embodiment, $\alpha$, $\beta$ were set as $\alpha=63$ and $\beta=3$. Based on such setting, computation was conducted. Here, iron loss is compared to that of the related art practice.

In the related art practice, a calculation formula of iron loss is generally expressed as $$W_{core} = B^2\{\sigma_H f + \sigma_e d^2 f^2\} U \qquad (15)$$

($\sigma_H$: coefficient of hysteresis loss, $\sigma_E$: coefficient of eddy current, d: plate thickness of a sheet, U: a total weight of iron).

Further, it is a general practice to alter coefficients of a thickness portion of a stator core on a rear side thereof and a teeth portion in the same Equation for calculation.

The magnetic flux density B varies depending on a rotational speed, a voltage and an output current value.

In particular, an inner voltage Equation, involving a component corresponding to a drop, is expressed as $$V_i = \sqrt{(V_O + RI_{AC})^2 + (XI_{AC})^2} \qquad (16).$$

Converting this inner voltage to the amount of magnetic fluxes gives $$\phi_l = \frac{V_l}{2.22 \frac{P^2 T}{120} \text{rpm}} \times 10^{-3}. \qquad (17)$$

Dividing the amount of magnetic fluxes by a magnetic flux path cross-sectional area S results in the magnetic flux density as expressed $$B = \frac{\phi_l}{S}. \quad (18)$$

Substituting the magnetic flux density B to Equation (15) allowed iron loss to be obtained.

The calculation needs to execute large numbers of steps using complicated equations as required in the calculation stated above. Also, such a calculation has a low precision with the resultant power generating torque in an increased discrepancy from a correct value.

DETAILED DESCRIPTION OF PREFERRED EMBODIMENTS

Figure 1:
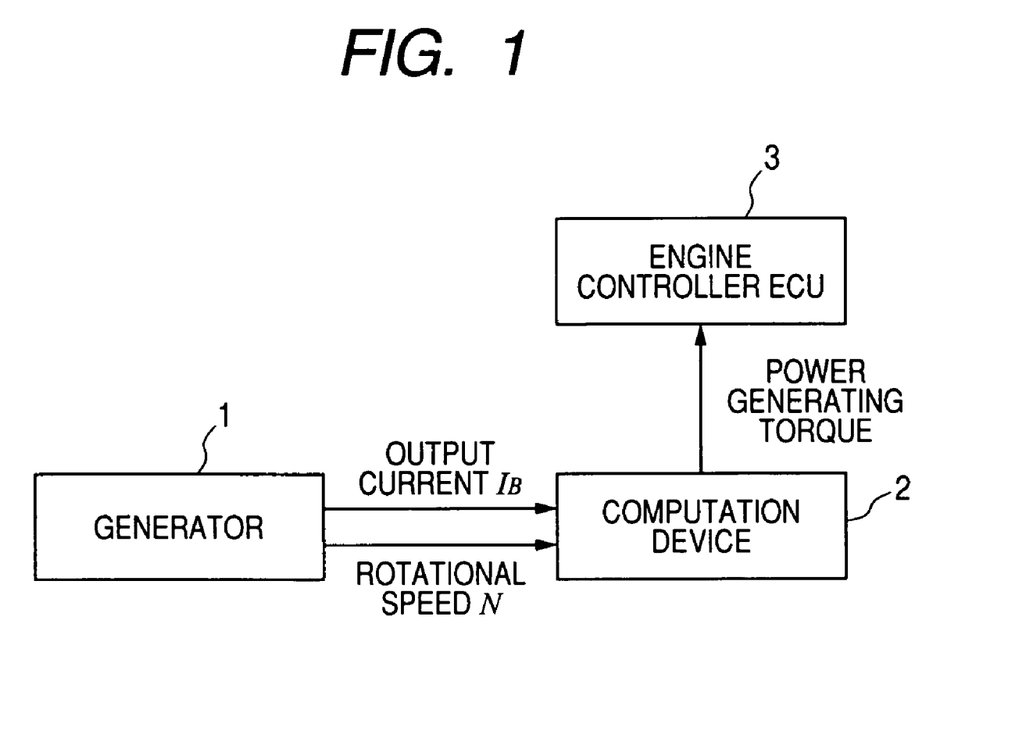
FIG. 1 is a structural view of a vehicular generator.

An engine, shown in FIG. 1, drives a vehicular generator (alternator) via a belt. The generator (alternator) 1 generates an output converted to a DC power and then supplied to a battery and electrical loads of a vehicle. The generator 1 is controlled to provide a power output with an output voltage at an appropriate value in response to a detected voltage of the battery to which the electrical loads are connected in normal practice. A computation device 2 is placed to compute information indicating a torque for power generation (power generating toque) from information given from the generator 1.

An engine controller ECU 3 retrieves, from the computation device 2, information indicative of a power generating torque produced by the generator 1 depending on the need and determines the amount of fuel to be injected to the engine at a rate controlled in view of the power generating torque information, thereby achieving stability in the rotation of the engine.

Next, a method of calculating a torque is described below. An IG (ignition) terminal of a regulator (not shown) in the generator 1 detects a vehicular key switch being turned on. Then, a torque calculation program is progressively executed. As shown in FIG. 1, the computation device 2 is supplied with an output current value $I_B$ and a rotational speed N from the generator 2. A rotary sensor (not shown) directly retrieves the rotational speed.

The computation device 2 executes the computation based on such inputs to provide power generating torque information as an output.

Figure 2:
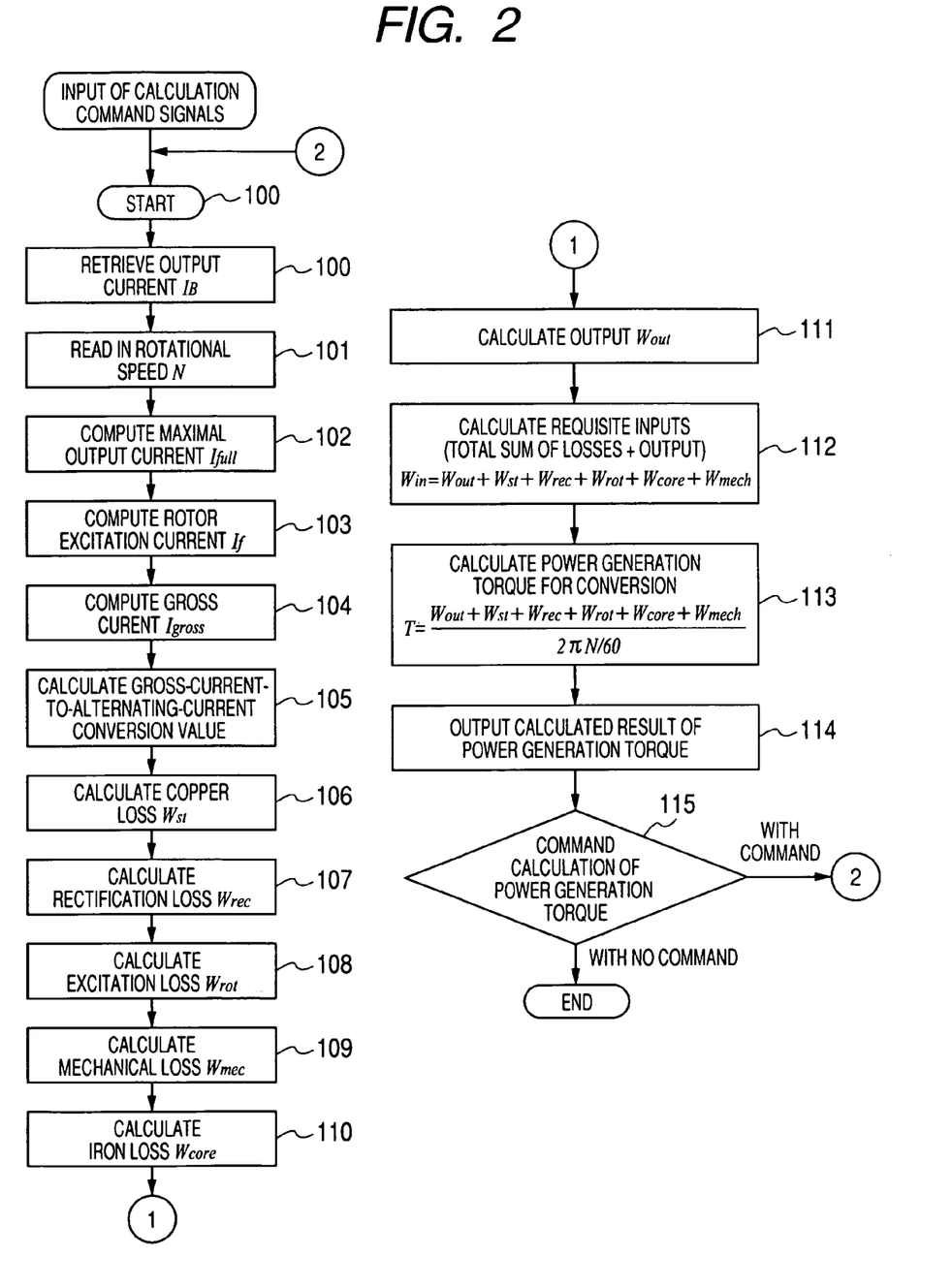
FIG. 2 is a flow chart showing a flow in executing torque calculation.
Figure 3:
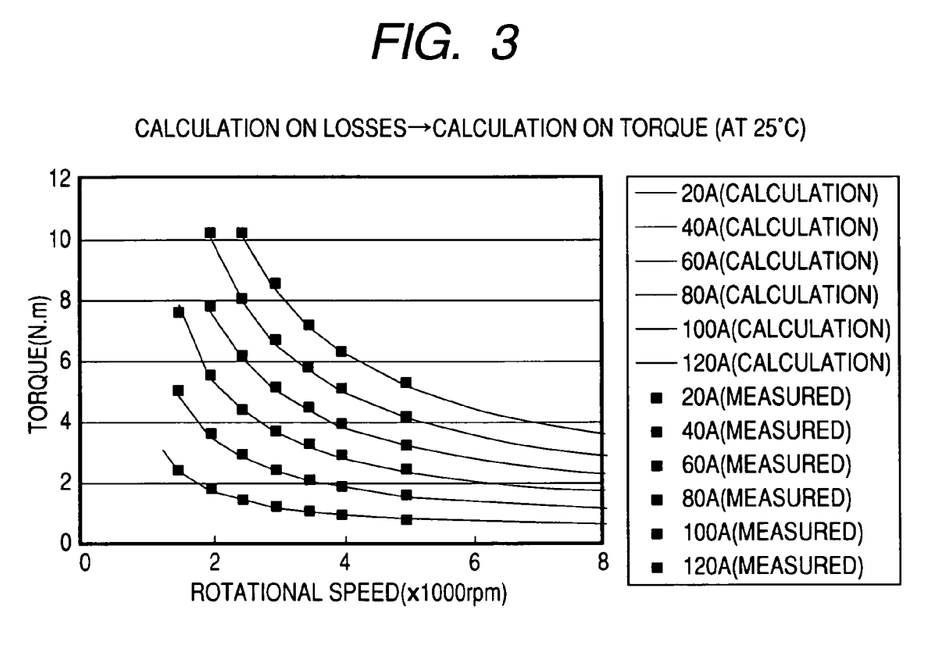
FIG. 3 is a view representing a comparison outcome between a torque experimental value and a calculation result in a first embodiment.
Figure 4:
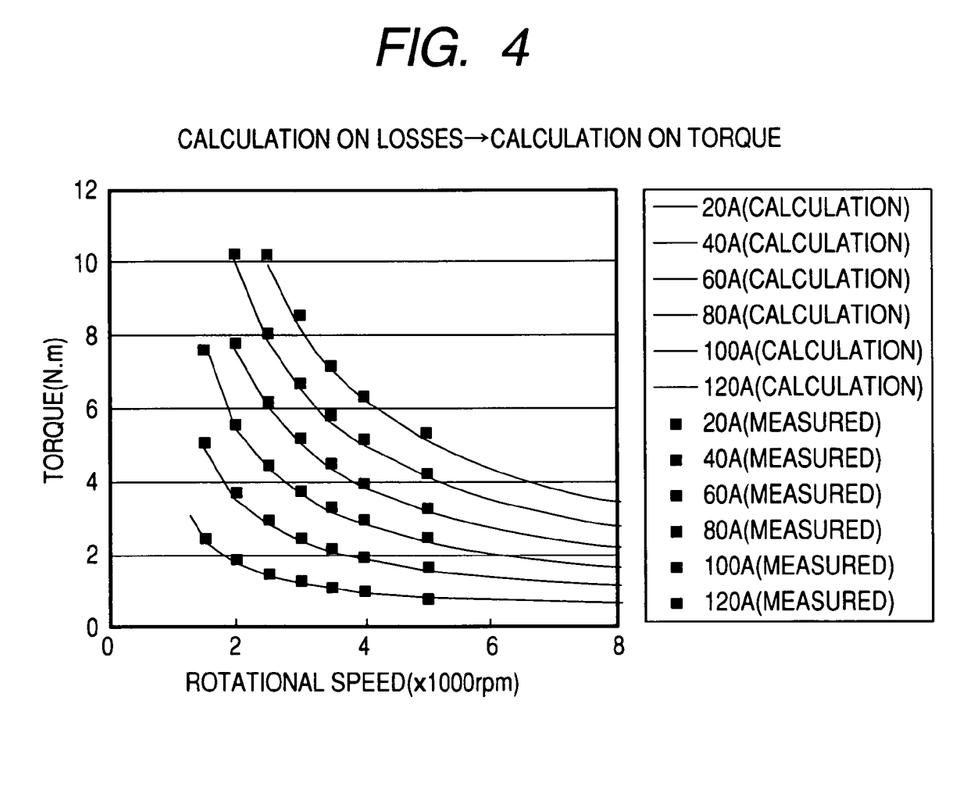
FIG. 4 is a view representing a comparison outcome between a torque experimental value and a calculation result in a second embodiment.

FIG. 2 shows a flowchart of a basic sequence of executing torque calculation. Output current and rotational speed are taken and using these information allowed calculations on an output (W) and loss (W), upon which the computation is executed to obtain a demanded drive power (W) equivalent to a sum of the output (W) and loss (W). Since the rotational speed is input, the computation device 2 can calculates torque based on a value of the rotational speed and drive power to provide a calculation result as an output.

Hereunder, a detail description is given of a method of calculating the amount of loss with reference to FIG. 2.

First, upon receipt of calculation command signal, the operation is executed to generate electric power while a flow of the present calculation starts. The current sensor provides the output current $I_B$ and the rotary sensor provides the rotational speed N. Also, the rotational speed may be extracted based on an output frequency of an alternating current voltage of the generator.

In step 102, the operation is executed to compute maximal current $I_{full}$ of product information based on a value of the rotational speed N using an approximation formula. This value may be extracted from a map. Also, maximal excitation current $I_{full}$ is preliminarily set as product information.

First, in step 103, the operation is executed to compute excitation current of a rotor.

Excitation current If of the rotor is obtained by Equation (12) as expressed $$If = If_{full} \cdot \left( \frac{I_B}{I_{full}} \right).$$

In the next step 104, gross current $I_{gross}$ is computed in a formula expressed as $$I_{gross} = I_{DC} + If = \left( 1 + \frac{If_{full}}{I_{full}} \right) I_B$$

Subsequently, in step 105, AC conversion is executed.

In step 106, copper loss is calculated based on Equation (19) expressed as $$W_{si} = \alpha I_B^2 (k_1 + k_2 I_B^2)$$

In succeeding step 107, rectification loss is calculated using Equation (17) as $$W_{rec} = 2Vd\left( 1 + \frac{If_{full}}{I_{full}} \right) I_B.$$

In the next step 108, excitation loss is computed in a formula expressed as $$W_{rot} = V_{DC} If_{full} \left( \frac{I_B}{I_{full}} \right)^2.$$

In step 109, mechanical loss is calculated in a formula expressed as $$W_{mech} = \{ \gamma \cdot f + \epsilon \cdot f^2 \}.$$

In succeeding step 110, iron loss is calculated based on Equation (19) as expressed as $$W_{core} = \{ \alpha \cdot f + \beta \cdot f^2 \} \frac{I_B}{I_{full}}$$

In step 111, output power is obtained in a formula expressed as $$W_{out}=V_B I_B.$$

In step 112, a required input (W) is obtained as a total sum of the factors expressed as $$W_{in}=W_{out}+W_{st}+W_{rec}+W_{rot}+W_{mech}+W_{core}.$$

In step 113, the above factors are converted to $$T_{gen}=(W_{out}+W_{st}+W_{rec}+W_{rot}+W_{mech}+W_{core})/(2\pi N/60).$$

In step 114, a calculation result is output.

Thereafter, the operation stands ready until a subsequent calculation command appears in step 115 and upon receipt of the command, the above steps are repeatedly executed again.

EFFECT AND ADVANTAGES

Table 1 represents an error between experimental values of electric power generation of the present system and calculated results.

With a method of calculating various factors in the related art Lundell-type synchronizing machine, a calculation result on torque has a calculation error in a range of 10 to 20% and, hence, such a result has been insufficient to be reliable as a prediction value of torque for improving controllability of the engine. In contrast, adopting the calculation method of the present system introducing new calculation formulae for the Lundell-type synchronizing machine enables a further increase in calculation precision making it possible to enhance remarkable improvement over controllability of the engine. Further, due to the presence of calculation formulae being simplified, a remarkable reduction can be achieved in a calculation time interval.

Especially, power generating torque is possible to be computed based on only the rotational speed and power generation current, enabling a remarkable reduction in the number of sensors with the resultant reduction in cost. This also results in reduction in processing time interval for the ECU to retrieve data and simplification in software with the resultant reduction in scale of circuits such as memories.

Further, in comparison to a map system, the method of the present invention can achieve remarkable reduction in a volume of data to be stored and a volume of data to be retrieved with the resultant advantageous effect of remarkably simplifying the calculation device.

OTHER EMBODIMENTS

In contrast to the method of the first embodiment, a modified form of the calculation method of the first embodiment was carried out to perform calculation using iron loss as expressed as $$W_{core}=\{\alpha \cdot f\} I_{DC}.$$

In contrast to the method of the first embodiment, a primary component of the frequency is dominant and, hence, a square component was disregarded. Similarly, mechanical loss was treated disregarding the square component. In this case, although a slight amount of loss is encountered in calculation precision, such loss is acceptable depending on the engine. In such a case, a further simplified calculation is obtained, thereby achieving reduction in cost of the calculation device.

TABLE 1

Calculation Value based on Calculation Formulae of Present Embodiment, Actual Measurement Value and Error

| Rotational Speed (× 1000) | | 1.5 | 2 | 2.5 | 3 | 3.5 | 4 | 5 |
|---|---|---|---|---|---|---|---|---|
| 20A | Actually Measured Value | 2.45 | 1.85 | 1.47 | 1.25 | 1.10 | 0.95 | 0.75 |
| | Calculation | 2.38 | 1.76 | 1.44 | 1.23 | 1.09 | 0.99 | 0.85 |
| | Error (%) | 3.12 | 5.30 | 2.13 | 1.45 | 0.82 | −3.70 | −11.31 |
| 40A | Actually Measured Value | 5.05 | 3.70 | 2.96 | 2.47 | 2.15 | 1.90 | 1.60 |
| | Calculation | 4.92 | 3.53 | 2.85 | 2.41 | 2.11 | 1.89 | 1.59 |
| | Error (%) | 2.68 | 4.82 | 3.83 | 2.44 | 1.79 | 0.49 | 0.71 |
| 60A | Actually Measured Value | 7.60 | 5.55 | 4.45 | 3.73 | 3.30 | 2.95 | 2.45 |
| | Calculation | 7.87 | 5.47 | 4.38 | 3.68 | 3.21 | 2.86 | 2.38 |
| | Error (%) | −3.47 | 1.44 | 1.65 | 1.38 | 2.89 | 3.19 | 2.87 |
| 80A | Actually Measured Value | | 7.80 | 6.20 | 5.20 | 4.50 | 3.95 | 3.25 |
| | Calculation | | 7.64 | 6.05 | 5.06 | 4.39 | 3.90 | 3.23 |
| | Error (%) | | 2.11 | 2.43 | 2.81 | 2.42 | 1.17 | 0.47 |
| 100A | Actually Measured Value | | | 8.05 | 6.70 | 5.80 | 5.13 | 4.20 |
| | Calculation | | | 7.92 | 6.58 | 5.69 | 5.05 | 4.16 |
| | Error (%) | | | 1.61 | 1.87 | 1.85 | 1.64 | 0.89 |
| 120A | Actually Measured Value | | | | 8.55 | 7.20 | 6.33 | 5.30 |
| | Calculation | | | | 8.28 | 7.14 | 6.31 | 5.18 |
| | Error (%) | | | | 3.30 | 0.83 | 0.28 | 2.22 |

TABLE 2

Calculation Value based on Calculation Formula of Second Embodiment, Actual Measurement Value and Error

| Rotational Speed (× 1000) | | 1.5 | 2 | 2.5 | 3 | 3.5 | 4 | 5 |
|---|---|---|---|---|---|---|---|---|
| 20A | Actually Measured Value | 2.45 | 1.85 | 1.47 | 1.25 | 1.10 | 0.95 | 0.75 |
| | Calculation | 2.36 | 1.75 | 1.43 | 1.22 | 1.08 | 0.97 | 0.83 |
| | Error (%) | 3.74 | 6.00 | 3.00 | 2.54 | 2.19 | −2.07 | −9.19 |
| 40A | Actually Measured Value | 5.05 | 3.70 | 2.96 | 2.47 | 2.15 | 1.90 | 1.60 |
| | Calculation | 4.89 | 3.51 | 2.83 | 2.38 | 2.08 | 1.86 | 1.55 |
| | Error (%) | 3.28 | 5.51 | 4.73 | 3.56 | 3.22 | 2.25 | 3.27 |
| 60A | Actually Measured Value | 7.60 | 5.55 | 4.45 | 3.73 | 3.30 | 2.95 | 2.45 |
| | Calculation | 7.83 | 5.44 | 4.34 | 3.64 | 3.16 | 2.81 | 2.32 |
| | Error (%) | −2.94 | 2.09 | 2.51 | 2.48 | 4.32 | 4.99 | 5.49 |
| 80A | Actually Measured Value | | 7.80 | 6.20 | 5.20 | 4.50 | 3.95 | 3.25 |
| | Calculation | | 7.59 | 6.00 | 5.01 | 4.33 | 3.84 | 3.16 |
| | Error (%) | | 2.74 | 3.26 | 3.89 | 3.81 | 2.89 | 2.98 |
| 100A | Actually Measured Value | | | 8.05 | 6.70 | 5.80 | 5.13 | 4.20 |
| | Calculation | | | 7.86 | 6.51 | 5.62 | 4.97 | 4.06 |
| | Error (%) | | | 2.40 | 2.89 | 3.18 | 3.31 | 3.34 |

TABLE 2-continued

Calculation Value based on Calculation Formula of
Second Embodiment, Actual Measurement Value and Error

| | Rotational Speed (× 1000) | 1.5 | 2 | 2.5 | 3 | 3.5 | 4 | 5 |
|---|---|---|---|---|---|---|---|---|
| 120A | Actually Measured Value | | | | 8.55 | 7.20 | 6.33 | 5.30 |
| | Calculation | | | | 8.20 | 7.05 | 6.21 | 5.07 |
| | Error (%) | | | | 4.30 | 2.09 | 1.86 | 4.61 |

The present invention may be embodied in other specific forms without departing from the spirit or essential characteristics thereof. The foregoing embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A method of calculating a power generating torque of a Lundell-type synchronous generator that generates alternating electric power to be converted to direct electric power supplied to a battery for charging and electrical loads, the method comprising:
   inputting factors consisting of only electric power output current $I_B$ and a rotational speed N;
   calculating an electric energy and an amount of loss based on the factors;
   calculating a power generating torque based on a total sum of the electric energy and the amount of loss; and
   outputting the power generating torque as a calculation result.

2. The method of calculating the power generating torque according to claim 1, wherein:
   the calculating the power generating torque comprises preliminarily determining a rectifying-element drop voltage Vdi, and a battery charging voltage $V_{DC}$ and DC/AC conversion rate k as specified values.

3. The method of calculating the power generating torque according to claim 1, wherein:
   the calculating the power generating torque comprises preliminarily determining product information including stator resistance R, maximal excitation current $If_{full}$, a maximal output current value $I_{full}$ and an average surrounding temperature T in terms of the rotational speed when installed on an engine, and a number P of poles.

4. The method of calculating the power generating torque according to claim 1, wherein:
   the calculating the amount of loss comprises calculating a total sum of copper loss, rectification loss, excitation loss, iron loss and mechanical loss;
   wherein the copper loss and the excitation loss are computed using a square value of output current, and the rectification loss and the iron loss are computed using a single-multiplication value.

5. The method of calculating the power generating torque according to claim 1, wherein:
   the calculating the amount of loss comprises calculating a total sum of copper loss, rectification loss, excitation loss, iron loss and mechanical loss;
   wherein the iron loss is computed as a sum of a single-multiplication proportion and a square proportion of the rotational speed N.

6. The method of calculating the power generating torque according to claim 1, wherein:
   the calculating the amount of loss comprises calculating a total sum of copper loss, rectification loss, excitation loss, iron loss and mechanical loss;
   wherein the iron loss is computed in a single-multiplication proportion of the rotational speed N.

7. The method of calculating the power generating torque according to claim 1, wherein:
   the copper loss is calculated upon speculating a stator temperature based on information related to output current and the rotational speed and altering a resistance value based on the stator temperature.

8. The method of calculating the power generating torque according to claim 1, wherein:
   the rectification loss is a value resulting from the output current two times an element drop.

9. The method of calculating the power generating torque according to claim 1, wherein:
   the excitation loss is proportionate to a square of output current; and
   wherein the excitation loss is computed based on information related to a maximal excitation current $If_{full}$.

10. The method of calculating the power generating torque according to claim 1, wherein:
    the amount of loss is computed as a total sum of copper loss, rectification loss, excitation loss, iron loss and mechanical loss; and
    wherein the mechanical loss is computed as a sum of a single-multiplication proportion and a square proportion of the rotational speed N.

11. The method of calculating the power generating torque according to claim 1, wherein:
    the amount of loss is computed as a total sum of copper loss, rectification loss, excitation loss, iron loss and mechanical loss; and
    is wherein the mechanical loss is computed in a single-multiplication proportion of the rotational speed N.

12. The method of calculating the power generating torque according to claim 2, wherein:
    the calculating the power generating torque comprises preliminarily determining product information including stator resistance R, maximal excitation current $If_{full}$, a maximal output current value $I_{full}$ and an average surrounding temperature T in terms of the rotational speed when installed on an engine, and a number P of poles.

13. The method of calculating the power generating torque according to claim 2, wherein:
    the calculating the amount of loss comprises calculating a total sum of copper loss, rectification loss, excitation loss, iron loss and mechanical loss;
    wherein the copper loss and the excitation loss are computed using a square value of output current, and the rectification loss and the iron loss are computed using a single-multiplication value.

14. The method of calculating the power generating torque according to claim 2, wherein:
    the calculating the amount of loss comprises calculating a total sum of copper loss, rectification loss, excitation loss, iron loss and mechanical loss;
    wherein the iron loss is computed as a sum of a single-multiplication proportion and a square proportion of the rotational speed N.

15. The method of calculating the power generating torque according to claim 2, wherein:
the calculating the amount of loss comprises calculating a total sum of copper loss, rectification loss, excitation loss, iron loss and mechanical loss;
wherein the iron loss is computed in a single-multiplication proportion of the rotational speed N.

16. The method of calculating the power generating torque according to claim 2, wherein:
the copper loss is calculated upon speculating a stator temperature based on information related to output current and the rotational speed and altering a resistance value based on the stator temperature.

17. The method of calculating the power generating torque according to claim 2, wherein:
the rectification loss is a value resulting from the output current two times an element drop.

18. The method of calculating the power generating torque according to claim 2, wherein:
the excitation loss is proportionate to a square of output current; and
wherein the excitation loss is computed based on information related to a maximal excitation current $If_{full}$.

19. The method of calculating the power generating torque according to claim 2, wherein:
the amount of loss is computed as a total sum of copper loss, rectification loss, excitation loss, iron loss and mechanical loss; and
wherein the mechanical loss is computed as a sum of a single-multiplication proportion and a square proportion of the rotational speed N.

20. An apparatus for calculating a power generating torque of a Lundell-type synchronous generator that generates alternating electric power to be converted to direct electric power supplied to a battery for charging and electrical loads, the apparatus comprising:
inputting means for inputting factors consisting of only electric power output current $I_B$ and a rotational speed N;
first calculating means for calculating an electric energy and an amount of loss based on the factors;
second calculating means for calculating a power generating torque based on a total sum of the electric energy and the amount of loss; and
outputting means for outputting the power generating torque as a calculation result.

* * * * *